United States Patent
Chan (10) Patent No.: US 6,658,507 B1
(45) Date of Patent: Dec. 2, 2003

(54) SYSTEM AND METHOD FOR HOT INSERTION OF COMPUTER-RELATED ADD-ON CARDS

(75) Inventor: Wan-Kan Chan, Taipei Hsien (TW)

(73) Assignees: Wistron Corporation, Hsi-Chih (TW); Acer Incorporated, Hsi-Chih (TW)

( * ) Notice: Subject to any disclaimer, the term of this patent is extended or adjusted under 35 U.S.C. 154(b) by 0 days.

(21) Appl. No.: 09/143,979

(22) Filed: Aug. 31, 1998

(51) Int. Cl.[7] ............................................. G06F 13/00
(52) U.S. Cl. .................. 710/100; 710/301; 710/302; 710/303; 710/304
(58) Field of Search .............................. 710/100, 101, 710/102, 103, 301, 302, 303, 304

(56) References Cited

U.S. PATENT DOCUMENTS

| | | | |
|---|---|---|---|
| 5,784,576 A | | 7/1998 | Guthrie et al. |
| 5,835,733 A | * | 11/1998 | Walsh et al. ................. 710/101 |
| 5,894,561 A | * | 4/1999 | Kuan et al. ................... 710/302 |
| 5,974,489 A | * | 10/1999 | Williams et al. ............. 710/102 |
| 5,996,035 A | * | 11/1999 | Allen et al. .................. 710/103 |

OTHER PUBLICATIONS

PCI Bus Hot Plug Spec., Jun. 15, 1997, Compaq Corp.
PCI HOT–Plug Technology, Nov. 18, 1996, Compaq Corp.
Compaq PCI Hot–Plug in a Microsoft Windows NT Server Environment, Jan. 1997, Compaq Corp.

* cited by examiner

Primary Examiner—Frantz B. Jean
(74) Attorney, Agent, or Firm—Winston Hsu (57) ABSTRACT

This invention is a novel design for hot inserting/removing add-on cards in a data processing system while not increasing the complexity of design nor cost of manufacturing. A single hot insertion controller and its corresponding driver is used in conjunction with a plurality of operand latches and readbcak buffers to monitor all add-on card slots and to control the arbiter switches, the signal switches, and the power switches of the add-on card slots, and the add-on card for hot insertion/removal while preventing the other components on the data bus and application devices from using those components, thus avoiding any interference during the insertion/removal.

2 Claims, 5 Drawing Sheets

SYSTEM AND METHOD FOR HOT INSERTION OF COMPUTER-RELATED ADD-ON CARDS

BACKGROUND OF THE INVENTION

1. Field of the Invention

This invention relates generally to a data processing system having add-on card slots, and more particularly to a data processing system for hot inserting/removing add-on cards withtout affecting the current data processing operation.

2. Background of the Invention

Many existing data processing systems have add-on card slots to utilize add-on cards to increase/enhance performance. "Hot insertion" is the capability to add and remove add-on devices to a data processing system while the data processing system is running and have the operating system automatically recognize the change. In a data processing system having hot-insertion capability, add-on cards can be inserted/removed into/from the data processing system while the data processing system is powered and running. Such capability is especially desirable in network data processing systems. For example, users may remove and insert add-on cards for maintenance without having to shut down the server or suspend operations.

To achieve convenient backward compatibility, no hardware changes should be required for standard add-on cards and only the add-on card drivers should need to be changed to support hot-insertion. Further, system hardware and software support should be provided for monitoring and controlling the hot insertion/removal of, for example, PCI cards. The prior art includes Compaq Computer Corporation's implementation of PCI hot-insertion technology in its severs. A hot-insertion controller and corresponding driver for each PCI slot for monitoring and controlling the hot insertion/removal of PCI cards is utilized. Generally, the more PCI slots a data processing system has, the more hot-insertion controllers and corresponding drivers it needs, but this will increase the manufacturing costs and the complexity of the system.

SUMMARY OF THE INVENTION

What is needed therefore, is a data processing system and a method which will achieve hot-insertion without increasing the complexity of design and higher manufacturing costs. The present invention utilizes only one hot insertion controller and its corresponding driver in conjunction with a plurality of operand latches to monitor all add-on card slots and control the signal switches and power switches of the add-on card slots for hot insertion.

The present invention comprises a data processing system, having a data bus and a power supply, for hot inserting an add-on card into an add-on card slot is provided. The data processing system includes an add-on card slot having a plurality of signal lines for transmitting a first group of signals, a power switch coupled to the power supply and the add-on card slot a signal switch coupled to the data bus and the add-on card slot, and detecting means for detecting an insertion of the add-on card into the add-on card slot. The data processing system also includes driver means and control means. The driver means is responsive to the insertion of the add-on card into the add-on card slot for generating a first, second, third, and fourth instructions in sequence. The control means is responsive to the first instruction for requesting the data bus and thereafter turns on the power switch. The control means further is responsive to the second instruction for resetting the add-on card. The control means still further is responsive to the third instruction for pulling the first group of signals logic high. The control means is further responsive to the fourth instruction for requesting the data bus and thereafter turns on the signal switch.

The present invention also comprises a method for hot inserting an add-on card into an add-on card slot of a data processing system having a data bus. The add-on card slot has a plurality of signal lines for transmitting a first group of signals. The method comprises the steps of requesting an IDLE state of the data bus in response to an insertion of the add-on card into the add-on card slot; turning on power thereby supplying power to the add-on card upon granting of the data bus; resetting the add-on card; pulling the first group of signals logic high; requesting another IDLE state of the data bus; and electrically coupling the add-on card to the data bus upon granting of the data bus.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE INVENTION

Figure 1:
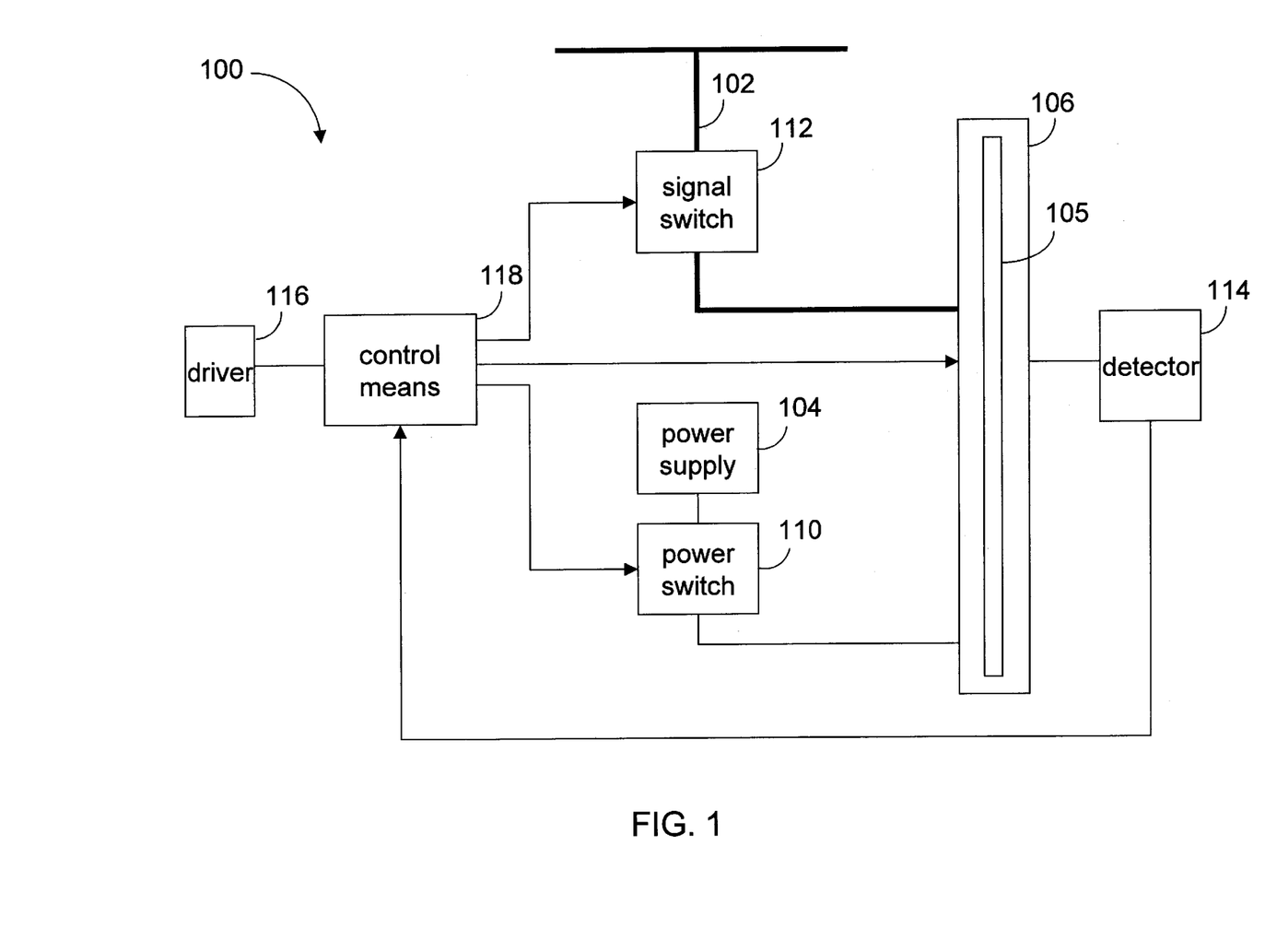
FIG. 1 is a simplified block diagram of the elements of a data processing system of the present invention.

FIG. 1 is a simplified block diagram of the elements of a data processing system 100 of the present invention. In one embodiment, data processing system 100, having a data bus 102 and a power supply 104, for hot inserting/removing an add-on card 105 into/from an add-on card slot 106, comprises the add-on card slot 106 having a plurality of signal lines for transmitting a first group of signals, a power switch 110 coupled to the power supply 104 and the add-on card slot 106, a signal switch 112 coupled to the data bus 102 and the add-on card slot 106, and a detector 114 for detecting an insertion of the add-on card 105 into the add-on card slot 106 and detecting an add-on card 105 remove instruction. In a preferred embodiment of the present invention, a lock switch on the add-on card slot 106 is employed as the detector 114. When inserting/removing an add-on card 105, user utilizes the lock switch to lock/unlock the add-on card 105 so that it detects the insertion/removal of the add-on card 105. In another embodiment of the present invention, users can utilize a user interface to notify the data processing system 100 of the insertion or removal of the add-on card 105.

The data processing system 100 also includes a driver 116 and control means 118. For an add-on card hot insertion, the driver 116 generates a first, second, third, and fourth instructions in sequence in response to the insertion of the add-on card 105 into the add-on card slot 106. In a preferred embodiment of the present invention, when the detector detects the insertion of the add-on card 105 into the add-on card slot 106, it notifies the control means 118 of the insertion, and then the control means 118 generates an interrupt signal to the driver 116. The driver 116 generates the first, second, third, and fourth instructions in sequence in response to the interrupt signal.

The control means 118 requests the data bus 102 and thereafter turns on the power switch 110 in response to the first instruction. The power switch 110 is utilized to isolate the add-on card 105 from the running data bus 102 for preventing the other components on the data bus 102 and applications using those components from interference resulting from sudden impedance change, charging effect or short circuit during hot insertion. Only when the data bus 102 is in IDLE state, is it safe to turn on the power switch 110 because the power consumption is minimized due to termination of all transactions on the data bus 102 and then the voltage drop experienced during charging the inserting add-on card can be tolerated.

Figure 2:
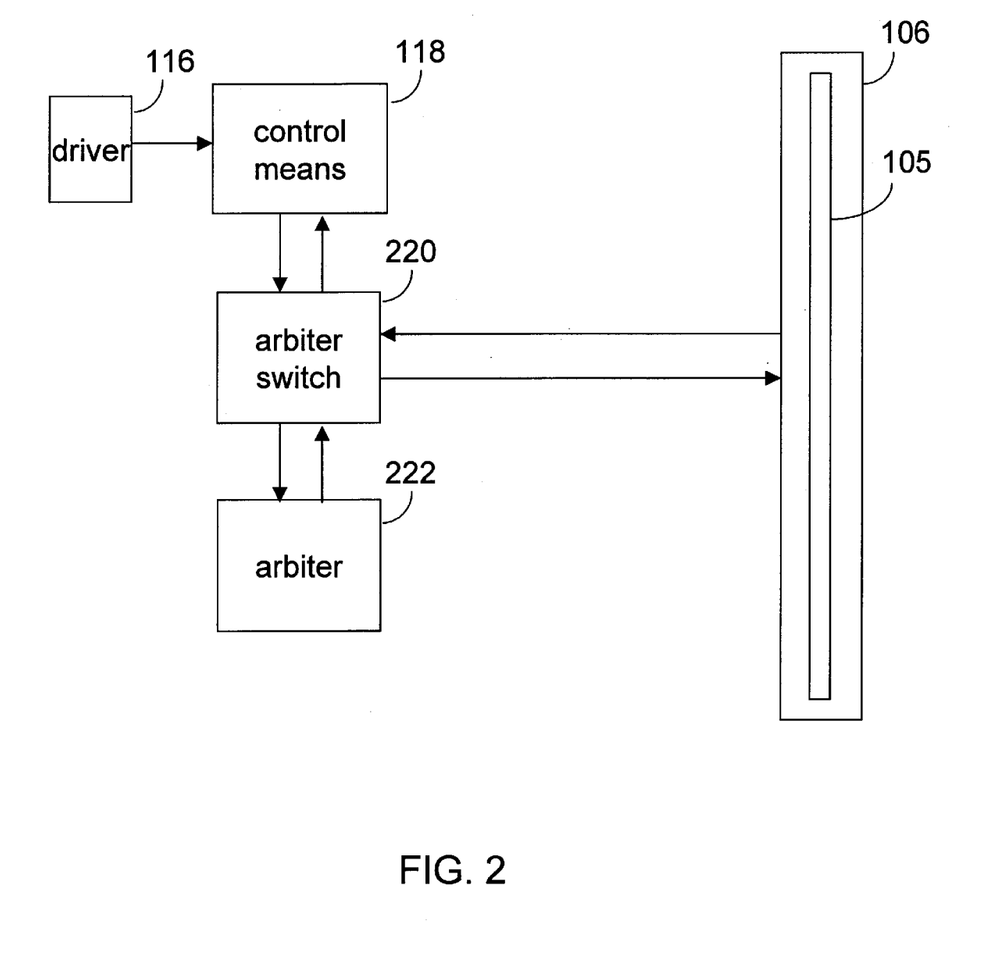
FIG. 2 is a preferred embodiment of the data processing system for requesting the data bus in accordance with the present invention.

In a preferred embodiment of the present invention as shown in FIG. 2, data processing system 100 further comprises an arbiter switch 220 and an arbiter 222 coupled to the arbiter switch 220. The arbiter switch 220 switches from the add-on card slot 106 to the control means 118 in response to the insertion of the add-on card 105 into the add-on card slot 106. When the arbiter switch 220 switches to the control means 118, the control means 118 instead of the add-on card 105, acts as a master on the data bus 102. The arbiter switch 220 will switch back to the add-on card slot 106 for normal operation on data bus 102 when hot insertion on data bus 102 is completed. The control means 118 generates the request signal to request the data bus 102 in response to the first instruction. The arbiter 222 will grant the data bus 102 to said control means 118 in response to a request signal.

Figure 3:
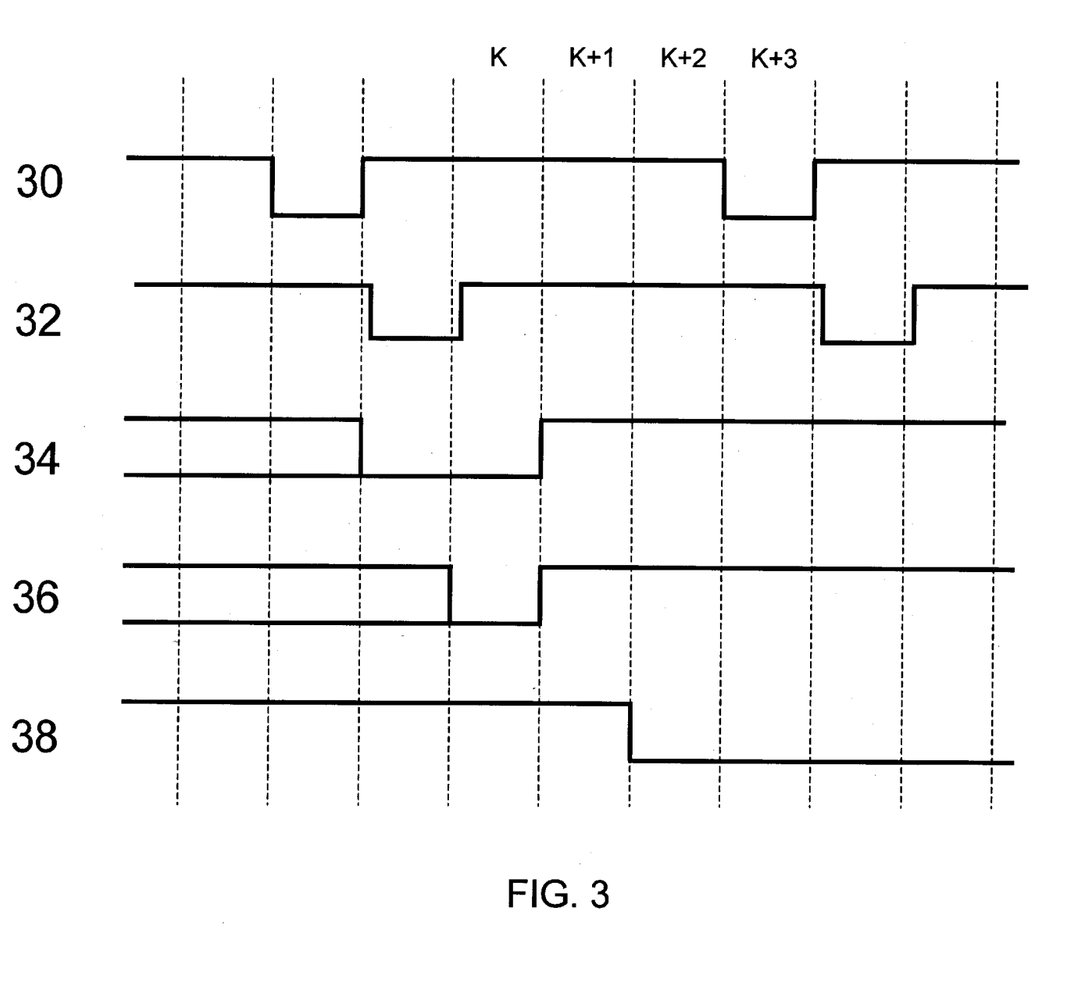
FIG. 3 is a timing diagram for,requesting the IDLE state of the data bus in accordance with the present invention.

FIG. 3 shows a timing diagram of a preferred embodiment of the present invention to request the data bus 102 for obtaining predictable IDLE state. In the preferred embodiment of the present invention, the add-on card 105 is a PCI card, the add-on card slot 106 is a PCI slot, and the data bus 102 is PCI bus. In accordance with the PCI Local Bus Specification, if a request signal REQ# is asserted and a grant signal GNT# corresponding to REQ# is granted, it is not necessary to issue FRAME# before the REQ# deasserted. In order to obtain predictable IDLE state on the PCI bus, a dummy request signal Dummy REQ# 34 is asserted to arbitrate for the PCI bus as shown in FIG. 3. Once the current transaction terminated (both FRAME# 30 and IRDY# 32 are logic high) at the end of clock K and the grant signal Dummy GNT# 36 is asserted low, no FRAME# corresponding to the Dummy REQ# 34 will be issued and then IDLE state on the PCI bus begins until a new FRAME# is asserted. Normally, the arbiter will grant the Dummy GNT# 36 a number of clocks to support Address/Data Stepping, but in case there is a higher priority REQ# pending, the arbiter will deassert the Dummy GNT# 36 at clock K+1 immediately. The arbiter will grant the bus to the higher priority REQ# by asserting a higher priority GNT# 38 at clock K+2, which is one clock after the de-assertion of the Dummy GNT# 36 in accordance with the PCI Local Bus Specification. The new master will issue its FRAME# at clock K+3. Accordingly, it provides two guaranteed clocks of IDLE state (clock K+1 and K+2) on the PCI bus for turning on the power switch 110

The control means 118 resets the add-on card 105 further in response to the second instruction. The signals of the add-on card 105, whose lines are coupled to the add-on card slot 106, will be pulled to tri-state during resetting the add-on card 105. The control means 118 pulls the first group of signals logic high still further in response to the third instruction. When turning on the signal switch 112, it must ensure that all signals on the slot side have already reached the same stable logic level as those corresponding signals on the bus side reach when the data bus 102 is IDLE to prevent transient voltage drop on the bus side. When the data bus 102 is IDLE, the logic level of those signals on the bus side corresponding to the first group of signals is high. Accordingly, it is necessary for the first group of signals to be pulled to logic high for reaching the same stable logic level as that of those corresponding signals on the bus side. In a preferred embodiment of the present invention, when the signal switch 112 is turned on during IDLE state for the PCI bus, the sustained tri-state signals (FRAME#, IDRY#, TRDY#, STOP#, DEVSEL#, LOCK#, and PERR#), which on the bus side are logic high, on the slot side must be pulled logic high. Further, because of resetting the PCI card in response to the second instruction, the tri-state signals (AD[31:0], C/BE[3:0]#, and PAR#) on the slot side have been tri-stated as those on the bus side are in IDLE state of the PCI bus. Though the open drain signals (SERR# and INT[D:A]) have no timing relation to any transaction on the PCI bus, they are treated as the sustained tri-state signals for preventing signal glitch on the bus.

The control means 118 requests the data bus 102 and thereafter turns on the signal switch 112 further in response to the fourth instruction. The signal switch 112 is utilized to isolate the add-on card 105 from the running data bus 102 for preventing the other components on the data bus 102 and applications using those components from disturbance during hot insertion. Only when the data bus 102 is in IDLE state, is it safe to turn on the signal switch 112 because no transaction is in progress on the data bus 102. The procedure for requesting the IDLE state on the data bus 102 to turn on the signal switch 112 is substantially the same as that for the power switch 110. In a preferred embodiment of the present invention, the control means 118 generates a request signal to request the data bus 102 in response to the fourth instruction, and the arbiter grants the data bus 102 to the control means 118 in response to the request signal. A preferred embodiment for requesting the IDLE state on the data bus 102 is also shown in FIG. 3. In the preferred embodiment of the present invention, the add-on card 105 is a PCI card, the add-on card slot 106 is a PCI slot, and the data bus 102 is PCI bus.

Figure 4:
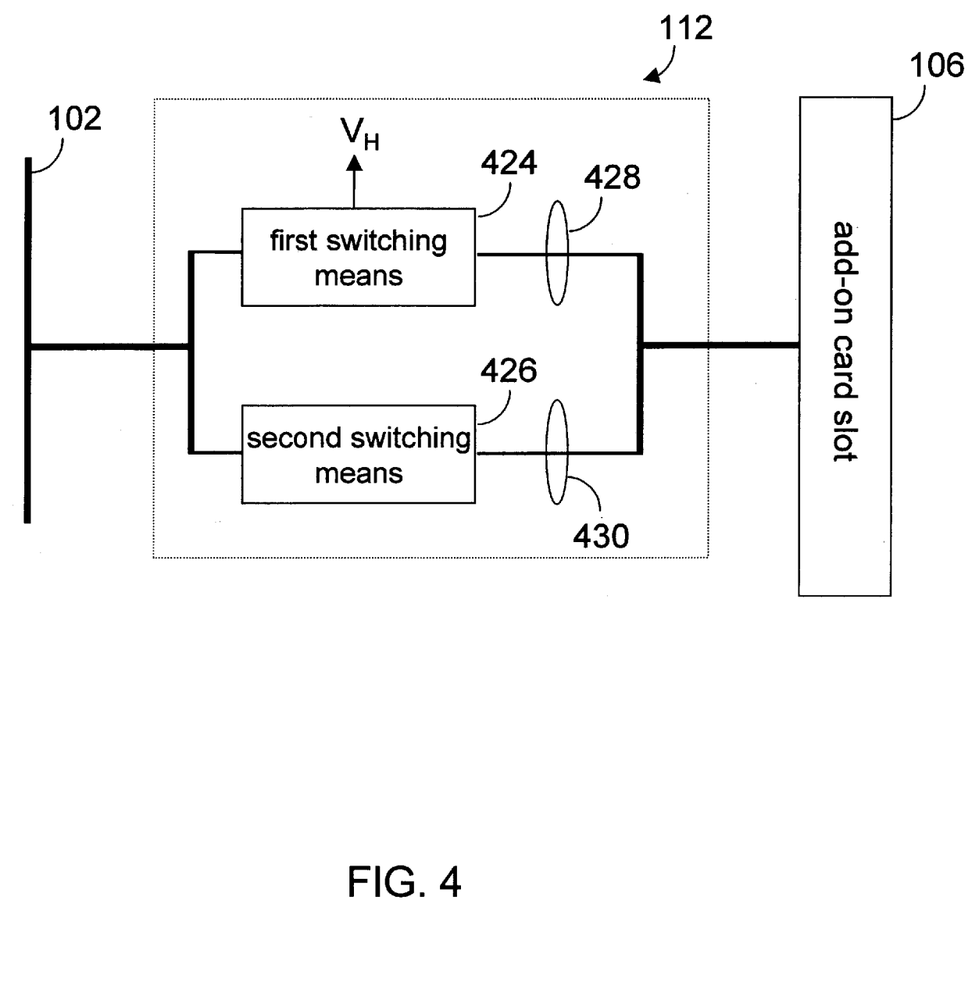
FIG. 4 is a preferred embodiment of the signal switch for hot insertion in accordance with the present invention.

A preferred embodiment of the signal switch 112 is shown in FIG. 4. The add-on card slot 106 further includes a second group of signal lines. In the preferred embodiment of the present invention, the signal switch 112 includes first switching means 424, coupled to the first group of signal lines 428 and second switching means 426 coupled to the second group of signal lines 430. The first switching means 424 switches to a logic high voltage $V_H$ for pulling the first group of signals logic high in response to the third instruction, and switches to the data bus 102 thereby electrically coupling the first group of signal lines 428 with the data bus 102 in response to the fourth instruction. The second switching means 426 switches to the data bus 102 thereby electrically coupling the second group of signal lines 430 with the data bus 102 in response to the fourth instruction.

Figure 5:
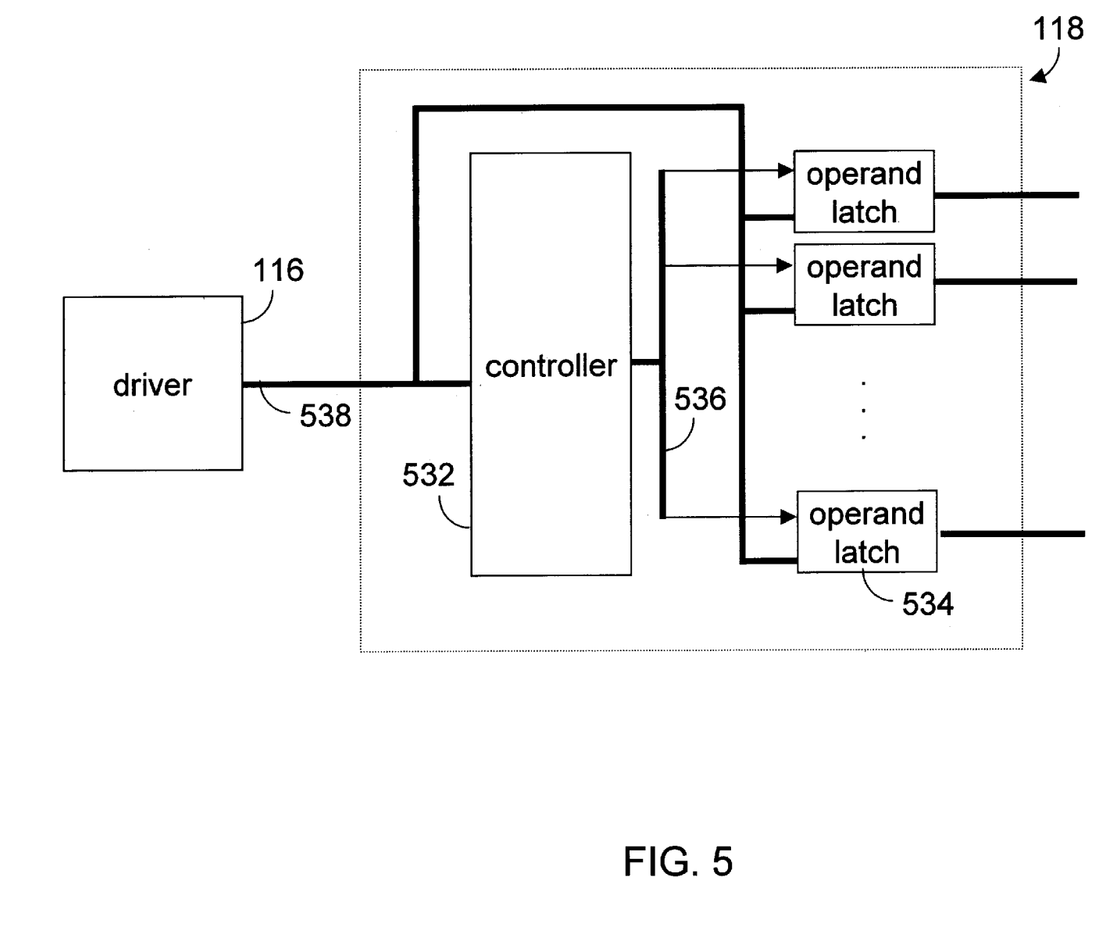
FIG. 5 is a preferred embodiment of the control means in accordance with the present invention.

A preferred embodiment of the control means 118 is shown in FIG. 5. In the preferred embodiment of the present invention, the instructions include control commands and their corresponding operands transmitted by a bus 538, and the control means 118 includes a controller 532 and at least one operand latch 534 for each add-on card slot. The controller 532 requests the data bus. 102 and thereafter generates a first strobe signal in response to the first control command. The controller 532 generates a second strobe signal further in response to the second control command. The controller 532 generates a third strobe signal still further in response to the third control command. The controller 532 requests the data bus 102 and thereafter generates a fourth strobe signal further in response to the fourth control command. The operand latch 534 latches the first operand for turning on the power switch 110 in response to the first strobe signal. The operand latch 534 latches the second operand for resetting the add-on card 105 further in response to the second strobe signal. The operand latch 534 latches the third operand for pulling the first group of signals logic high still further in response to the third strobe signal. The operand latch 534 latches the fourth operand for turning on the signal switch 112 further in response to the fourth strobe signal.

The controller 532 utilizes a strobe signal 536 for controlling the operand latch corresponding to the add-on card slot being hot inserting to latch the operand, while the other operand latches will not be activated by the strobe signal 536 so that the other add-on card slots will keep their status without any change. In a preferred embodiment of the present invention, the strobe signal 536 consists of an "1" and a plurality of "0", wherein the location of "1" means the location of the hot-inserting slot. For example, there are 8 add-on card slots on the data bus 102. When a hot insertion happens on slot 2, the format of the strobing signal 536 will be [00000010]. Each bit of the strobing signal 536 is fed to the corresponding operand latch. Only when such bit is "1", does the corresponding operand latch 534 latches the operand corresponding to the control command, while the other operand latches remain their status without change. A preferred embodiment of the operand consists of a plurality of "0" and "1", while all operands are transmitted to each operand latch by a bus 538. Such operands latched by the operand latch are transmitted to its corresponding arbiter switch, power switch, signal switch, and add-on card slot for controlling their behavior. In a preferred embodiment of the control means 118, it further includes at least one readback buffer coupled to its corresponding add-on card slot for reading the status of its corresponding add-on card slot. Such status will be fed back by the bus 538 to the driver 116 for determining the successfulness of the control commands the driver issued (e.g., whether the power is successfully supplying to the slot), and the current situation the add-on card slot is in (e.g., whether the add-on card is in the add-on card slot). Accordingly, it utilizes only one controller and its corresponding driver in conjunction with a plurality of operand latches and readback buffers to monitor all add-on card slots and control the arbiter switches, the signal switches, and the power switches of the add-on card slots, and the add-on card for hot insertion.

In accordance with another aspect of the invention, for an add-on card hot removal, the driver 116 initiates a stop protocol for the add-on card 105 and thereafter generates a fifth, sixth, and seventh instructions in sequence in response to the add-on card 105 remove instruction. In a preferred embodiment of the present invention, when the detector detects the add-on card 105 remove instruction, it notifies the control means 118 of the removal, and then the control means 118 generates an interrupt signal to the driver 116. The driver 116 generates the fifth, sixth, and seventh instructions in sequence in response to the interrupt signal. In a preferred embodiment of the stop protocol, the driver 116 will wait a predetermined time for the add-on card 105 to finish its transaction and then stop the add-on card 105 requesting the data bus 102. If the add-on card 105 is out of order and request the data bus 102 continuously, the driver 116 will notify the data processing system 100 to ignore the request of the add-on card 105 after the predetermined time wait and then the add-on card 105 will never be granted to. use the data bus 102.

The control means 118 requests the data bus 102 and thereafter resets the add-on card 105 in response to the fifth instruction. For a bad add-on card, the signals may not return to normal logic level that bus defines at IDLE state. However, it must ensure that all signals on the slot side have already reached normal logic level that bus defines at IDLE state to prevent transient abnormal voltage on the bus side when turning off the signal switch 112. Further, to prevent the transaction in progress from interrupting, it must ensure that the transaction of the add-on card 105 is completed when resetting the add-on card 105. Accordingly, it is necessary to reset the add-on card 105 for reaching normal logic level when the data bus 102 is IDLE. In a preferred embodiment of the present invention as shown in FIG. 2, data processing system 100 further comprises an arbiter switch 220 and an arbiter 222 coupled to the arbiter switch 220. The arbiter switch 220 switches from the add-on card slot 106 to the control means 118 in response to the add-on card 105 remove instruction. When the arbiter switch 220 switches to the control means 118, the control means 118 instead of the add-on card 105, acts as a master on the data bus 102. The arbiter switch 220 will switch back to the add-on card slot 106 for normal operation on data bus 102 when hot removal on data bus 102 finishes. The control means 118 generates the request signal to request the data bus 1102 in response to the fifth instruction. The arbiter 222 will grant the data bus 102 to the control means 118 in response to a request signal. A preferred embodiment for requesting the IDLE state on the data bus 102 is also shown in FIG. 3. In the preferred embodiment of the present invention, the add-on card 105 is a PCI card, the add-on card slot 106 is a PCI slot, and the data bus 102 is PCI bus.

The control means 118 requests the data bus 102 and thereafter turns off the signal switch 112 further in response to the sixth instruction. Only when the data bus 102 is in IDLE state, is it safe to turn off the signal switch 112 because no transaction is in progress on the data bus 102. Accordingly, it prevents the other components on the data bus 102 and applications using those components from disturbance during turning off the signal switch 112. In a preferred embodiment of the present invention, the control means 118 generates a request signal to request the data bus 102 in response to the sixth instruction, and the arbiter 222 grants the data bus 102 to the control means 118 in response to the request signal. A preferred embodiment for requesting the IDLE state on the data bus 102 is also shown in FIGS. 2 and 3. In the preferred embodiment of the present invention, the add-on card 105 is a PCI card, the add-on card slot 106 is a PCI slot, and the data bus 102 is PCI bus.

The control means 118 requests the data bus 102 and thereafter turns off the power switch 110 still further in response to the seventh instruction. Only when the data bus 102 is in IDLE state, is it safe to turn off the power switch 110 because the voltage change of turning off the power can be tolerated. Accordingly, it prevents the other components on the data bus 102 and applications using those components from disturbance during turning off the power switch 110. In a preferred embodiment of the present invention, the control means 118 generates a request signal to request the data bus 102 in response to the seventh instruction, and the arbiter 222 grants the data bus 102 to the control means 118 in response to the request signal. A preferred embodiment for requesting the IDLE state on the data bus 102 is also shown in FIGS. 2 and 3. In the preferred embodiment of the present invention, the add-on card 105 is a PCI card, the add-on card slot 106 is a PCI slot, and the data bus 102 is,PCI bus.

A preferred embodiment of the control means 118 is shown in FIG. 5. In the preferred embodiment of the present invention, the instructions include control commands and their corresponding operands transmitted by a bus 538, and the control means 118 includes a controller 532 and at least one operand latch 534 for each add-on card slot. The controller 532 requests the data bus 102 and thereafter generates fifth strobe signal in response to the fifth control command. The controller 532 requests the data buss 102 and thereafter generates sixth strobe signal further in response to the sixth control command . The controller 532 requests the data bus 102 and thereafter generates seventh strobe signal still further in responsive to the seventh control command. The operand latch 534 latches the fifth operand thereby resetting the add-on card 105 in response to the fifth strobe signal. The operand latch 534 latches the sixth operand thereby turning off the signal switch 112 further in response to the sixth strobe signal. The operand latch 534 latches the seventh operand thereby turning off the power switch 110 still further in response to the seventh strobe signal.

The controller 534 utilizes a strobe signal 536 for controlling the operand latch corresponding to the add-on card slot being hot removing to latch the operand, while the other operand latches will not be activated by the strobe signal 536 so that the other add-on card slots will keep their status without any change. In a preferred embodiment of the present invention, the strobe signal consists of an "1" and a plurality of "0", wherein the location of "1" means the location of the hot-removing slot. For example, there are 8 add-on card slots on the data bus 102. When a hot removal happens on slot 2, the format of the strobing signal will be [00000010]. Each bit of the strobing signal is fed to the corresponding operand latch. Only when such bit is "1", does the corresponding operand latch latches the operand corresponding to the control command, while the other operand latches remain their status without change. A preferred embodiment of the operand 30 consists of a plurality of "0" and "1", while all operands are transmitted to each operand latch by a bus 538. Such operands latched by the operand latch are transmitted to its corresponding arbiter switch, power switch, signal switch, and add-on card slot for controlling their behavior. In a preferred embodiment of the control means 118, it further includes at least one readback buffer coupled to its corresponding add-on card slot for reading the status of its corresponding add-on card slot. Such status will be fed back by the bus 538 to the driver 116 for determining the successfulness of the control commands the driver issued (e.g., whether the power is successfully off), and the current situation the add-on card slot is in (e.g., whether the add-on card subjects to the removal from the add-on card slot). Accordingly, it utilizes only one controller and its corresponding driver in conjunction with a plurality of operand latches and readbcak buffers to monitor all add-on card slots and control the arbiter switches, the signal switches, and the power switches of the add-on card slots, and the add-on card for hot removal.

The above description provides a full and complete description of the preferred embodiments of the present invention. Various modifications, alternate construction, and equivalent may be made by those skilled in the art without changing the scope or spirit of the invention. Accordingly, the above description and illustrations should not be, construed as limiting the scope of the invention which is defined by the following claims.

What is claimed is:

1. A data processing system for hot inserting an add-on card into an add-on card slot, said data processing system having a data bus and a power supply, comprising:

an add-on card slot having a plurality of signal lines for transmitting a first group of signals;

a power switch coupled to the power supply and said add-on card slot;

a signal switch coupled to the data bus and said add-on card slot;

detecting means for detecting an insertion of the add-on card into said add-on card slot;

driver means, responsive to the insertion of the add-on card into said add-on card slot for generating a first, second, third, and fourth instructions in sequence; and control means, being responsive to said first instruction for requesting the data bus and thereafter turning on said power switch, said control means further being responsive to said second instruction for resetting the add-on card, said control means still further being responsive to said third instruction for pulling said first group of signals logic high, and said control means being further responsive to said fourth instruction for requesting the data bus and thereafter turning on said signal switch;

wherein said instructions include control commands and their corresponding operands, and said control means includes a controller and an operand latch, said controller being responsive to said first control command for requesting the data bus and thereafter generating a first strobe signal, said controller further being responsive to said second control command for generating a second strobe signal, said controller still further being responsive to said third control command for generating a third strobe signal, and said controller being further responsive to said fourth control command for requesting the data bus and thereafter generating a fourth strobe signal, said operand latch being responsive to said first strobe signal for latching said first operand for turning on said power switch, said operand latch further being responsive to said second strobe signal for latching said second operand for resetting said add-on card, said operand latch still further being responsive to said third strobe signal for latching said third operand for pulling said first group of signals logic high, and said operand latch being further responsive to said fourth strobe signal for latching said fourth operand for turning on said signal switch.

2. A data processing system for hot removing an add-on card from an add-on card slot, said data processing system having a data bus and a power supply, comprising:

a power switch coupled to the power supply and said add-on card slot;

a signal switch coupled to the data bus and said add-on card slot;

detecting means for detecting an add-on card remove instruction;

driver means, responsive to the add-on card remove instruction for initiating a stop protocol for the add-on card and thereafter generating first, second and third instructions in sequence; and control means, being responsive to said first instruction for requesting the data bus and thereafter resetting the add-on card, said control means further being responsive to said second instruction for requesting the data bus and thereafter turning off said signal switch, and said control means still further being responsive to said third instruction for requesting the data bus and thereafter turning off said power switch;

wherein said instructions include control commands and their corresponding operands, and said control means includes a controller and an operand latch, said controller being responsive to said first control command for requesting the data bus and thereafter generating a first strobe signal, said controller further being responsive to said second control command for requesting the data bus and thereafter generating a second strobe signal, and said controller still further being responsive to said third control command for requesting the data bus and thereafter generating a third strobe signal, and said operand latch being responsive to said first strobe signal for latching said first operand thereby resetting the add-on card, said operand latch further being responsive to said second strobe signal for latching said second operand thereby turning off said signal switch, and said operand latch still further being responsive to said third strobe signal for latching said third operand thereby turning off said power switch.

* * * * *